(12) United States Patent
Ma

(10) Patent No.: US 6,267,937 B1
(45) Date of Patent: Jul. 31, 2001

(54) HEATING OF A STORAGE TRAP

(75) Inventor: Thomas Tsoi-Hei Ma, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/381,410

(22) PCT Filed: Oct. 22, 1998

(86) PCT No.: PCT/GB97/03550

§ 371 Date: Sep. 17, 1999

§ 102(e) Date: Sep. 17, 1999

(87) PCT Pub. No.: WO98/46868

PCT Pub. Date: Oct. 22, 1998

(30) Foreign Application Priority Data

Apr. 11, 1997 (GB) .................................. 9707340

(51) Int. Cl.⁷ ........................ B01D 53/92; B01D 53/94; B01D 53/96

(52) U.S. Cl. ..................... 423/213.2; 423/213.7; 423/239.1; 502/514

(58) Field of Search ............... 423/213.2, 213.5, 423/213.7, 239.1, 245.3; 60/274, 282, 294, 312; 502/514

(56) References Cited

U.S. PATENT DOCUMENTS

| 5,142,864 | * | 9/1992 | Dunne | 60/274 |
| 5,388,403 | * | 2/1995 | Nagami et al. | 60/276 |
| 5,402,641 | * | 4/1995 | Katoh et al. | 60/285 |
| 5,413,771 | * | 5/1995 | Ziebarth et al. | 423/239.1 |
| 5,433,074 | * | 7/1995 | Seto et al. | 60/301 |
| 5,472,673 | * | 12/1995 | Goto et al. | 422/169 |
| 5,743,084 | * | 4/1998 | Hepburn | 60/274 |
| 5,758,489 | * | 6/1998 | Hepburn et al. | 60/274 |
| 5,800,793 | * | 9/1998 | Cole | 423/213.2 |
| 5,814,287 | * | 9/1998 | Adamczyk, Jr. et al. | 423/213.7 |
| 5,939,037 | * | 9/1999 | Hepburn et al. | 423/213.5 |
| 5,950,421 | * | 9/1999 | Chattha et al. | 60/274 |
| 5,968,462 | * | 10/1999 | Suzuki | 423/213.2 |
| 5,974,788 | * | 11/1999 | Hepburn et al. | 60/274 |
| 6,089,015 | * | 7/2000 | Strehlau et al. | 60/274 |

FOREIGN PATENT DOCUMENTS

| 0 627 548 A1 | * | 7/1994 | (EP) . |
| 2 303 565 | * | 2/1997 | (GB) . |
| 6-307230 | * | 11/1994 | (JP) . |
| 7-102948 | * | 4/1995 | (JP) . |

* cited by examiner

Primary Examiner—Steven P. Griffin
Assistant Examiner—Timothy C Vanoy
(74) Attorney, Agent, or Firm—Jerome R. Drouillard

(57) ABSTRACT

A lean NOx trap in an exhaust system of a spark ignition internal combustion engine having a three-way catalyst upstream of the lean NOx trap, and the lean NOx trap connected in series along the exhaust system is heated by modulating the air to fuel ratio (AFR) of the engine cyclically at various frequencies such as 0.5 Hz, 1 Hz, 1.5 Hz, and 2 Hz, so that different portions of the lean NOx trap are heated at different times so as to completely remove sulfur from the lean NOx trap.

5 Claims, 2 Drawing Sheets

HEATING OF A STORAGE TRAP

FIELD OF THE INVENTION

The present invention relates to the heating of a gas storage trap and in particular of a trap, mounted in the exhaust system of an internal combustion engine, for storing oxides of nitrogen.

BACKGROUND OF THE INVENTION

When an internal combustion engine is operating in a lean burn mode, there is always an excess of oxygen present in the exhaust system. As a result, oxides of nitrogen (NOx) present in the exhaust gases while the engine is operating in lean burn mode cannot be reduced by a three-way catalytic converter. To avoid such NOx gases from being discharged into the ambient atmosphere, it has been proposed to store them temporarily in a trap and to release them into the exhaust stream at a later stage when the engine is operated with a rich or at least stoichiometric mixture.

NOx traps can be formed as modified three-way catalytic converters in which the matrix has additional NOx storage sites consisting of base metal oxides. In the presence of surplus oxygen and NOx gases, the base metal oxides are converted to nitrates thereby trapping the NOx gases. In a reducing atmosphere on the other hand, the metal nitrates decompose releasing the NOx back into the exhaust stream but at this time the functioning three-way catalyst will reduce the NOx gases to nitrogen that can safely be discharged into the atmosphere.

A problem encountered with such traps is that the base metal oxides will also react with oxides of sulphur to produce sulphates which are more stable compounds than nitrates and do not normally decompose when the engine is again run in a rich or stoichiometric mode. As a result, unless further steps are taken, the trap is poisoned by sulphur which, at least in Europe, is usually present in the fuel.

It has been found that the damage done to a trap by sulphur in the fuel is reversible in the presence of a reducing atmosphere if the trap is heated to above 650° C.

OBJECT OF THE INVENTION

The present invention seeks to provide a method of heating a lean NOx trap to a sufficiently high temperature to enable it to be desuplhated.

SUMMARY OF THE INVENTION

In accordance with the present invention, there is provided a method of desulphating a lean NOx trap (LNT) in an exhaust system of a spark ignition internal combustion engine having a three-way catalyst and the lean NOx trap connected in series along the exhaust system, the NOx trap containing both NOx and oxygen storage components, the method comprising modulating the air to fuel ratio (AFR) calibration of the engine cyclically, first with a lean calibration for a sufficient time to result in the presence of excess air in the exhaust gases to provide oxygen to be stored within the lean NOx trap, then with a rich calibration for a sufficient time to result in the presence of excess fuel in the exhaust gases initially to react completely with any oxygen stored in the three-way catalyst itself and subsequently for the remainder of the excess fuel to break through the three-way catalyst to react with the oxygen stored in the NOx trap so as to heat the NOx trap to a temperature in excess of 650° C.

Three-way catalysts currently in use all have oxygen storage capacity to cope with rich AFR excursions. Purely for the purpose of heating the NOx trap, the three-way catalyst is not required to store oxygen. However, as oxygen storage capacity is invariably present in the three-way catalyst, its presence must be allowed for in the fuel computation as it is essential for the excess fuel (i.e. unburnt hydrocarbons and carbon monoxide) to break through the catalytic converter and find its way to the storage trap if the latter is to be heated.

The concept of alternating between lean and rich calibrations, that is to say modulation of the AFR, is known for example from EP-A-0 627 548, and is used to maintain a mean stoichiometric mixture, as is required by a three-way catalyst. The invention differs from such engine operation in that it requires a much greater degree of AFR modulation and for a more prolonged modulation cycle period because heating the NOx trap to a temperature at which desulphating can occur requires many AFR modulation cycles during each of which oxygen must first be stored in the NOx trap and subsequently fuel break through must occur past the catalytic converter and reach the NOx trap to react with the stored oxygen.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
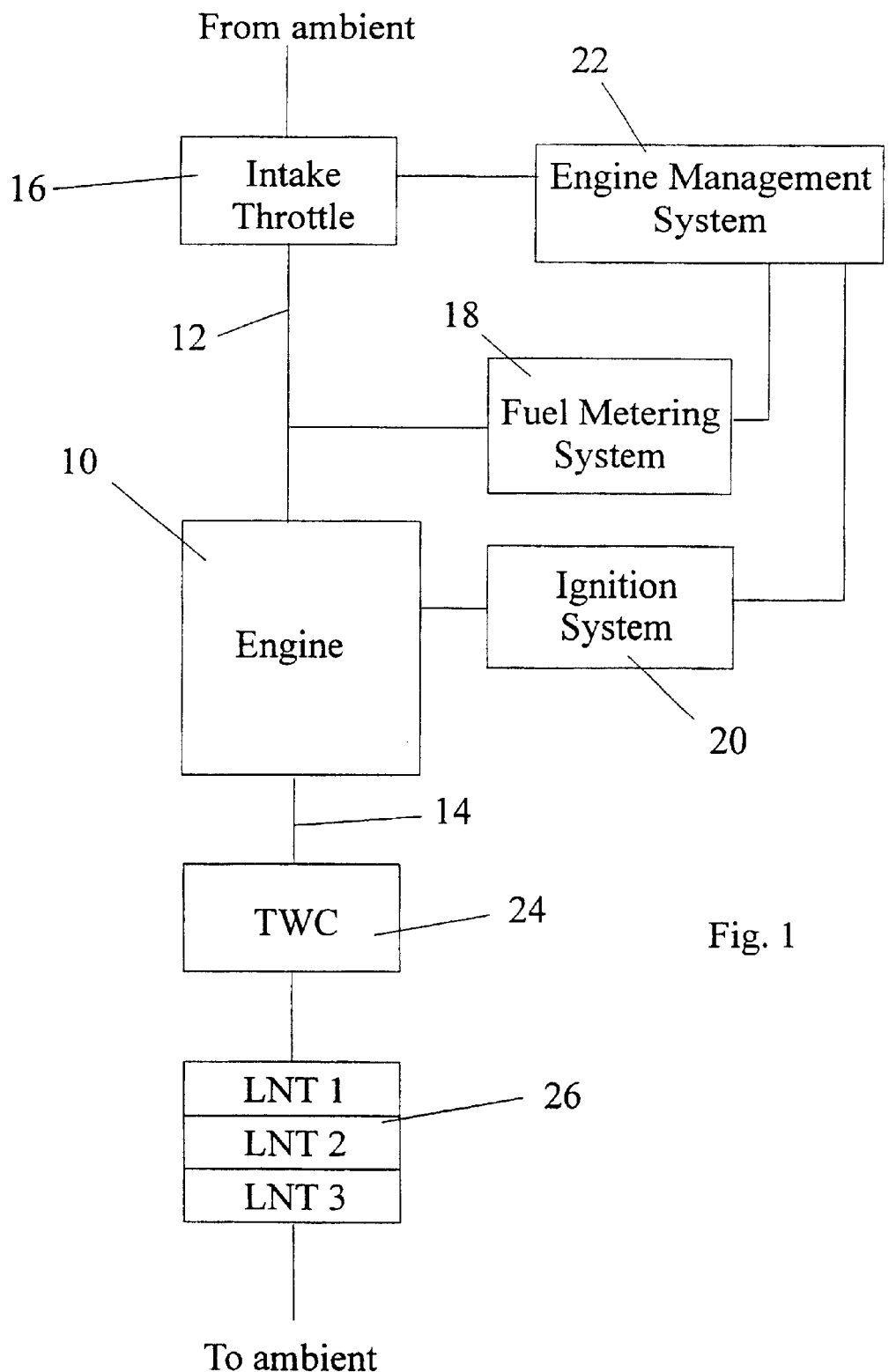
FIG. 1 is a schematic representation of an engine to which the present invention may be applied.

FIG. 1 shows a spark ignition engine 10 having an intake manifold 12 and an exhaust pipe 14. The intake air is regulated by an intake throttle 16, which is preferably electronically controlled. Fuel is introduced into the intake manifold 12 by a fuel metering system 18 and an ignition system 20 supplies spark energy to the engine spark plugs. The intake throttle 16, the fuel metering system 18 and the ignition system 20 are all controlled by a computerised engine management system 22.

In the exhaust pipe 14, there is arranged a catalytic converter 24 containing a three-way catalyst. A NOx trap 26, which is required to operate at a lower temperature than the catalytic converter 24, is arranged further downstream in the exhaust pipe 14 and is represented as consisting of three different slices LNT 1 to LNT 3 arranged in series with one another in the direction of gas flow. In practice, the three slices are all part of the same brick but they are considered separately herein because the reaction conditions vary along the length of the lean NOx trap.

The engine can be operated in a lean burn mode for fuel economy, during which NOx gases are stored in the NOx trap. The engine can also be operated in a stoichiometric mode for optimum operation of the three-way catalyst and in a rich mode for purging the NOx trap of stored NOx gases. Additionally, according to the invention, the engine can be operated in a modulated AFR mode to heat the NOx trap in order to enable it to be regenerated after exposure to sulphur.

In lean burn operation, the engine management system 22 sets a fuel quantity less than that required for stoichiometry. The three-way catalyst 24 acts as an oxidation catalyst and uses some of the oxygen to react with fuel not burned in the engine. Of the remainder of the oxygen, some is stored in the three way catalyst and the excess breaks through and flows to the lean NOx trap 26, where it is stored.

The NOx stored in the NOx trap is purged periodically by allowing a fuel spike to break through the catalytic converter 24. This will suffice to regenerate the NOx trap, provided that it has not been poisoned by sulphur in the fuel.

In stoichiometric operation, to ensure proper functioning of the three way catalyst, the AFR is intentionally modulated on either side of stoichiometry at a frequency of about 2 Hz, the amplitude of the modulation being typically 0.01 lambda (lambda being the relative excess air ratio). This heats to a small extent the three-way catalyst because during the lean part of the modulation cycle oxygen is stored in the three-way catalyst and during the rich part of the modulation cycle the stored oxygen reacts with surplus fuel to generate a small amount of heat within the catalyst. Throughout this mode of operation, fuel does not break through the catalytic converter to reach the NOx trap 26. There is no need under these conditions to send fuel spikes to the NOx trap as NOx gases are already reduced within the three-way catalyst and are not passed on for storage in the trap 26.

In rich operation, excess fuel will reach both the catalytic converter 24 and the NOx trap 26. This will purge the NOx trap 26 if it has not been poisoned but will not raise the temperature of the NOx trap because there will be no oxygen in the exhaust gases at that time and the finite quantity of oxygen stored in the trap will be exhausted and generate little heat to have any appreciable effect on the temperature of the NOx trap.

Figure 2:
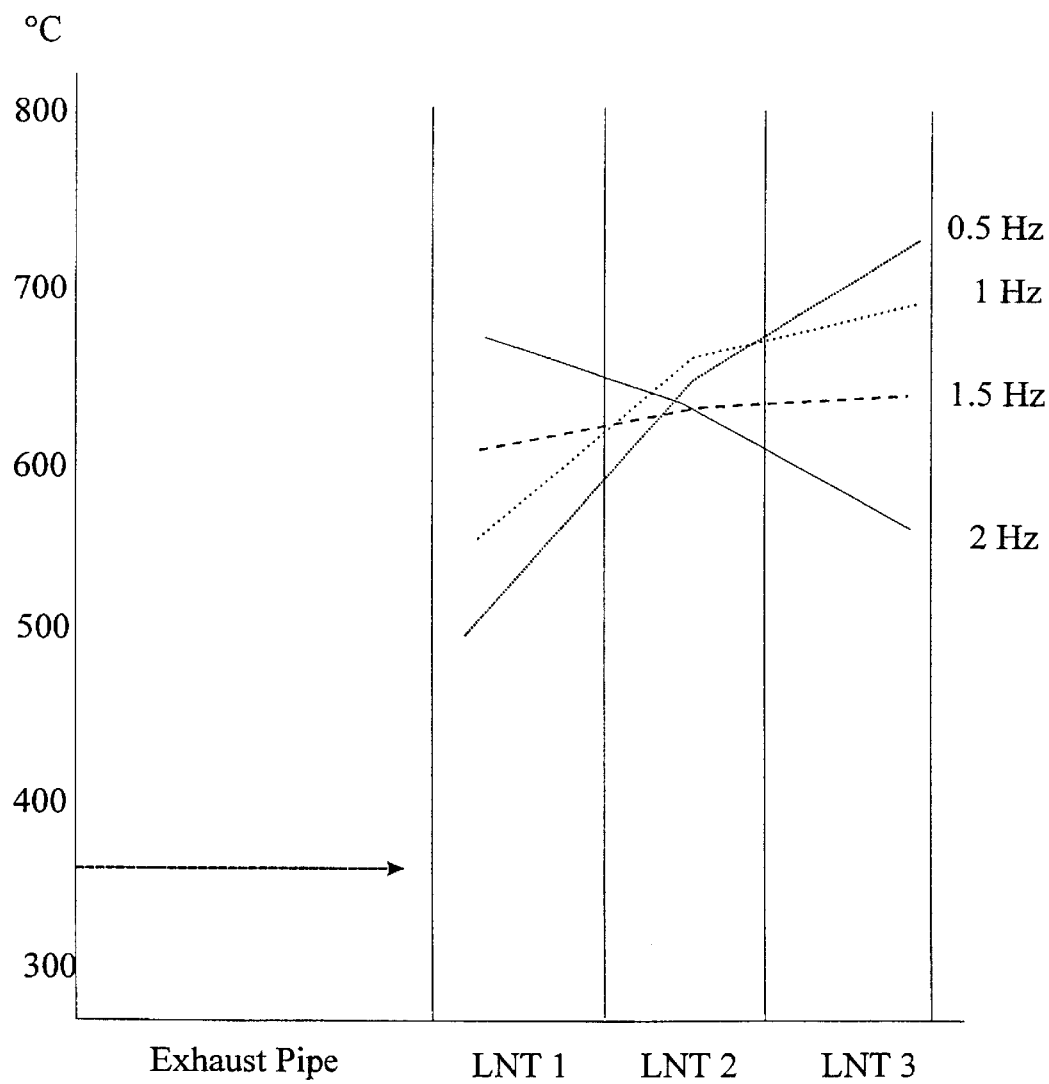
FIG. 2 is a graph showing the effect on the temperature gradient in the lean NOx trap of altering the frequency of AFR modulation.

To heat the NOx trap 26 to enable it to be regenerated after it has suffered sulphur poisoning requires the trap temperature to be raised significantly above 650° C. The amplitude of modulation of the AFR needed for this is of the order 0.1 lambda, that is some ten times the amplitude of the AFR modulation for operating the three way catalyst. The frequency of modulation is also important for reasons that will become apparent from a study of FIG. 2 showing an example of an AFR modulated exhaust flow through a lean NOx trap.

If the frequency of AFR modulation is very low, say 0.5 Hz (once every two seconds) then the fuel that breaks the three way catalyst will permeate the entire length of the lean NOx trap and use up all the oxygen that is stored through the three notional slices LNT 1 to LNT 3. All three slices are heated equally by the reaction of the fuel and stored oxygen but the cooling effect of the exhaust gases is felt most at the front of the NOx trap. Hence a temperature gradient is set up in the NOx trap and only the slice LNT 3 at the back of the trap reached a temperature in excess of 650° C. sufficient to burn off any sulphur in the trap. By contrast, if the modulation frequency is high, i.e. 2 Hz or more, then only the front slice LNT 1 sees the fuel excursions and it is heated up by using up the entire fuel. This results in direct heating of the front slice LNT 1 and the heating of the remaining slices LNT 2 and LNT 3 takes place only by contact with the gases heated up in the front slice. The temperature is not uniformly high in the NOx trap because heat is lost to the ambient from the gases as they progress down the trap 26 with the result slices LNT2 and LNT 3 do not reach a sufficiently high temperature to burn off any sulphur. In the intermediate frequency of 1 Hz a high temperature is reached in the second and third slices LNT 2 and LNT 3 of the trap but LNT 1 remains too cold to burn off any stored sulphur. At 1.5 Hz, the temperature distribution is uniform but unfortunately none of the slices is hot enough to burn off sulphur.

To achieve efficient burning off of sulphur from all parts of the lean NOx trap, in the preferred embodiment of the invention, the AFR modulation is performed at a swept frequency so that the different slices are heated sequentially and it is not attempted to run at a single compromise frequency that will result in uniform heating of the trap 26. Thus, the frequency of AFR modulation may for example be set first to a value of say 2 Hz and kept there for a sufficient time to purge the front end of the trap of sulphur. Thereafter, the frequency is changed to say 1 Hz and kept there until the centre slice LNT 2 is purged of sulphur. Finally, the frequency is set to 0.5 Hz to clean the last slice LNT 3 of the NOx trap. It will be appreciated that these frequency values will vary from engine to engine and will depend on operating conditions and are given here only as an illustration.

This mode of operation must be maintained for approximately 5 minutes for all parts of the NOx trap 26 to reach the desired sulphur purge temperature.

During the above AFR modulation period, the same steps of storing oxygen then reacting it with excess fuel will occur in the three-way catalyst and it too will be heated. It is therefore desirable to reduce the oxygen storage capacity of the three-way catalyst 24 to avoid it being heated excessively during this mode of operation. However, as some oxygen storage capacity is needed for other modes of operation, such heat as will inevitably be produced within the three-way catalyst during this mode of operation is not totally wasted as it will heat the gases reaching the NOx trap 26 and will indirectly heat the trap 26 despite some heat losses along the exhaust pipe connecting the three-way catalyst 24 to the NOx trap 26.

Even in the sulphur purge mode, the average value of the AFR should be stoichiometric to avoid undesired engine emissions.

Because changes in AFR affect output torque, to avoid the drivability of the vehicle being affected it is possible to modify the spark timing at the same time as changing the AFR so as to maintain substantially constant torque. If the engine is fitted with an electronic throttle, its position can also be modified in synchronism with changes in the AFR to reduce the effect on engine output torque.

What is claimed is:

1. A method of desulphating a lean NOx trap (LNT) in an exhaust system of a spark ignition internal combustion engine having a three-way catalyst and the lean NOx trap connected in series along the exhaust system, the NOx trap containing both NOx and oxygen storage components, the method comprising modulating the air to fuel ratio (AFR) calibration of the engine cyclically, first with a lean calibration for a sufficient time to result in the presence of excess air in the exhaust gases to provide oxygen to be stored within the lean NOx trap, then with a rich calibration for a sufficient time to result in the presence of excess fuel in the exhaust gases initially to react completely with any oxygen stored in the three-way catalyst itself and subsequently to react with the oxygen stored in the NOx trap so as to heat the NOx trap to a temperature in excess of 650° C., wherein the AFR is performed at a plurality of frequencies so as to heat different parts of the lean NOx trap at different times.

2. A method as claimed in claim 1, wherein the quantity of oxygen reaching the exhaust system during said lean calibration is sufficient to saturate the oxygen storage capacity of both the three-way catalyst and the NOx trap but not sufficient to lower the temperature of the NOx trap.

3. A method as claimed in claim 1, wherein the quantity of fuel reaching the exhaust system during said rich calibration is sufficient to cause break through of fuel past the three-way catalyst but not sufficient to cause break through of fuel past the NOx trap.

4. A method as claimed in claim 1, wherein the engine is operated with an average air to fuel ratio over the lean/rich AFR modulation cycle that is stoichiometric or leaner than stoichiometric.

5. A method as claimed in claim 1, wherein during the lean/rich AFR modulation cycle to heat the NOx trap, the spark timing and/or the engine throttle position are/is adjusted to avoid changes in engine output torque.

* * * * *